United States Patent
Bertsche et al.

(10) Patent No.: US 12,070,714 B2
(45) Date of Patent: Aug. 27, 2024

(54) FILTER UNIT FOR A BARRIER SYSTEM AND BARRIER SYSTEM, IN PARTICULAR ISOLATOR

(71) Applicant: Metall + Plastic GmbH, Radolfzell (DE)

(72) Inventors: Thomas Bertsche, Rielasingen-Worblingen (DE); Thomas Kassner, Radolfzell (DE)

(73) Assignee: OPTIMA pharma containment GMBH, Radolfzell am Bodensee (DE)

(*) Notice: Subject to any disclaimer, the term of this patent is extended or adjusted under 35 U.S.C. 154(b) by 677 days.

(21) Appl. No.: 17/042,510

(22) PCT Filed: May 31, 2019

(86) PCT No.: PCT/EP2019/064185
§ 371 (c)(1),
(2) Date: Sep. 28, 2020

(87) PCT Pub. No.: WO2019/233892
PCT Pub. Date: Dec. 12, 2019

(65) Prior Publication Data
US 2021/0086125 A1   Mar. 25, 2021

(30) Foreign Application Priority Data
Jun. 7, 2018 (DE) .................... 10 2018 113 609.9

(51) Int. Cl.
*F16K 27/02* (2006.01)
*B01D 46/42* (2006.01)
(Continued)

(52) U.S. Cl.
CPC ........ *B01D 46/4272* (2013.01); *F16K 1/2263* (2013.01); *F16K 1/2265* (2013.01);
(Continued)

(58) Field of Classification Search
CPC .. F16K 31/045; F16K 31/042; F16K 27/0232; F16K 27/0227; F16K 1/2265;
(Continued)

(56) References Cited

U.S. PATENT DOCUMENTS

| | | | |
|---|---|---|---|
| 4,202,365 A * | 5/1980 | Aoki | F16K 5/0673 251/173 |
| 4,433,987 A * | 2/1984 | Lenox | B01D 46/0004 55/319 |

(Continued)

FOREIGN PATENT DOCUMENTS

| | | |
|---|---|---|
| CN | 103418190 A | 12/2013 |
| CN | 104421062 A | 3/2015 |

(Continued)

OTHER PUBLICATIONS

International search report for patent application No. PCT/EP2019/064185 dated Sep. 3, 2019.

*Primary Examiner* — Matthew W Jellett
(74) *Attorney, Agent, or Firm* — Bachman & LaPointe, P.C.

(57) ABSTRACT

The invention relates to a closure device (28) for a filter unit (1) for the mutual and releasable insertion into a return air duct or exhaust air duct (2) of a barrier system (3), comprising a main body (30), an opening (6) in the main body (30) that can be peripherally bounded by an annular seal (11), a lid (10) that can be switched between an open position in which the opening (6) is open and a closed position in which it bears in a sealing manner against the annular seal (11) in order to selectively open and close the opening (6) and that has passing through it an imaginary longitudinal axis (A), wherein the lid (10) is connected in an articulated manner to the main body (30) so as to be able to pivot by means of at least one rotary articulation (40) through which there passes a pivot axis (S). The lid (10) is (Continued)

designed so as to be able to pivot at least double-eccentrically, wherein the first eccentricity arises from the fact that the pivot axis (S) is arranged at a distance ($A_1$) from a plane ($E_1$) in which a closure section ( ) of the lid (10) lies, and wherein the second eccentricity arises from the fact that the pivot axis (S) is arranged at a distance ($A_2$) from a vertical longitudinal mid-plane ($E_2$) which passes vertically through the center of the lid (10) when the latter is in its closed position.

14 Claims, 6 Drawing Sheets

(51) Int. Cl.
  *F16K 1/226* (2006.01)
  *F16K 31/04* (2006.01)
  *B01D 46/00* (2022.01)
(52) U.S. Cl.
  CPC ...... *F16K 27/0227* (2013.01); *F16K 27/0232* (2021.08); *B01D 46/0005* (2013.01); *B01D 2265/022* (2013.01); *B01D 2271/02* (2013.01); *F16K 31/042* (2013.01); *F16K 31/045* (2013.01)
(58) Field of Classification Search
  CPC .............. F16K 1/2263; B01D 2271/02; B01D 2265/022; B01D 46/4272; B01D 46/0005
  See application file for complete search history.

(56) References Cited

U.S. PATENT DOCUMENTS

| | | | |
|---|---|---|---|
| 4,759,781 | A | 7/1988 | Olson |
| 4,770,393 | A * | 9/1988 | Hubertson ............ F16K 1/2263 |
| | | | 251/305 |
| 4,905,966 | A * | 3/1990 | Aoyama ................ F16K 27/044 |
| | | | 251/173 |
| 2010/0176326 | A1 * | 7/2010 | Moison ................. F16K 27/067 |
| | | | 251/235 |

FOREIGN PATENT DOCUMENTS

| | | | | |
|---|---|---|---|---|
| CN | 204522561 | U | 8/2015 | |
| CN | 105927740 | A | 9/2016 | |
| CN | 106488795 | A | 3/2017 | |
| CN | 107304854 | A | 10/2017 | |
| DE | 2923885 | A1 | 12/1980 | |
| DE | 3744548 | A1 | 7/1988 | |
| DE | 10060004 | A1 | 6/2002 | |
| DE | 202004000309 | U1 | 4/2004 | |
| DE | 10250774 | A1 | 5/2004 | |
| DE | 202010017347 | U1 | 11/2011 | |
| DE | 202010017347 | U1 * | 1/2012 | ......... B01D 46/0004 |
| EP | 2666532 | B1 | 3/2017 | |
| FR | 2462630 | A1 | 2/1981 | |
| WO | 9116963 | A1 | 11/1991 | |
| WO | 2017088075 | A1 | 6/2017 | |

* cited by examiner

FILTER UNIT FOR A BARRIER SYSTEM AND BARRIER SYSTEM, IN PARTICULAR ISOLATOR

BACKGROUND OF THE INVENTION

The invention relates to a filter unit for removable insertion into a return air duct or exhaust air duct of a barrier system comprising a closure device for a filter unit for joint and removable insertion into a return air duct or exhaust air duct of a barrier system, the closure device comprising a main body, an opening in the main body which can be limited at the circumference by an annular seal, a lid which can be displaced between an open position, in which the opening is open, and a closed position, in which the lid contacts the annular seal in a sealing manner, in order to selectively open and close the opening and through which an imaginary longitudinal axis passes, the lid being connected to the main body in an articulated manner so as to be pivotable by means of at least one rotary joint through which a pivot axis passes.

Furthermore, the invention relates to a barrier system, in particular an isolator, preferably for pharmaceutical applications, comprising a treatment chamber and a return air duct or exhaust air duct and at least one filter unit which is realized according to the idea of the invention and which is into the return air duct or exhaust air duct inserted in a removable manner.

Exchangeable filter units for pharmaceutical barrier systems are known. Such a filter unit is disclosed in DE 20 2010 017 347 U1, for example. Concerning the known solution, an opening facing the barrier system is opened or closed by means of a lid which can be displaced in a translational manner, a spindle drive passing through the filter unit being provided for the translational displacement of the lid, the spindle drive occupying a central part of the interior enclosed by filter means of the filter unit. The disadvantage of the known system is that an essential uniform air distribution in the interior is hindered by the spindle drive.

An alternative filter unit is described in EP 2 666 532 B1. The known filter unit is characterized by a piston and a piston holder in the interior of the filter unit. Concerning the known solution, uniform air distribution is also hampered by the installations in the interior.

From WO 2017/088075 A1, another alternative filter unit is known, which is characterized in that a drive motor is assigned to the spindle drive known from DE 20 2010 017 347 U1 in a detachable manner, wherein said drive motor can be put on the spindle drive from the outside. The disadvantages described in the context of DE 20 2010 017 347 U1 also relate to this disclosure.

From practice, a filter unit is known which comprises a closure device which has a U-shaped annular seal which limits an opening at the circumference. The opening can be selectively opened or closed by means of a lid which can be pivoted about a pivot axis. The pivot axis passes through a closure section of the lid, i.e., the section which closes the opening, in the vertical longitudinal median plane of the lid. The vertical longitudinal median plane is disposed in such a manner that both the geometric center of the closure section and the normal vector of the closure section are located in the vertical longitudinal median plane when the lid is closed. In other words, the pivot axis passes centrally through the lid, which has a circular contour, i.e., said pivot axis coincides with or is disposed parallel to a diameter line of the opening. The rotational shafts of the lid are diametrically opposite to one another and the pivot axis of the lid passes through the center of the lid. However, the problem is that the lid contacts the annular seal when it is open and that it can flex or push the annular seal out of its fixation when the lid is displaced into its closed position. High frictional forces or frictional forces for the entire pivot duration result between the annular seal and the lid. High torques are therefore required for the displacement of the lid.

SUMMARY OF THE INVENTION

Starting from the aforementioned state of the art, the object of the invention is to indicate a filter unit which is of a simple design, in particular a filter cartridge, for removable insertion into a return air duct or exhaust air duct of a barrier system in which the annular seal is prevented from being flexed out in a reliable manner.

Furthermore, the object is to indicate a barrier system, in particular an isolator, preferably for pharmaceutical applications, which has such a filter unit.

Concerning the closure device, said object is attained by the features disclosed herein, i.e., concerning a generic filter unit by the fact that the lid is designed so as to be pivotable at least double-eccentrically, the first eccentricity resulting from the fact that the pivot axis is disposed at a distance from a closure section plane in which a closure section of the lid is located, and the second eccentricity resulting from the fact that the pivot axis is disposed at a distance from a vertical longitudinal median plane which passes vertically through the center of the lid when the latter is in its closed position.

Concerning the filter unit, said object is attained by the features disclosed herein, i.e., concerning the filter unit having filter means extending around the longitudinal axis for the cleaning of gas supplied in an axial direction via the opening from a treatment chamber of the barrier system and for the, in particular radial, discharge into the return air duct or exhaust air duct and having an interior which can be closed by closing the opening by means of the lid and which is surrounded by the filter means on the radial outside by the fact that the filter unit comprises a closure device according to the invention.

Concerning the barrier system, the object is attained by the features disclosed herein, i.e., concerning the barrier system by the fact that the barrier system comprises a filter unit according to this disclosure.

Advantageous embodiments of the invention are disclosed in the dependent claims.

All combinations of at least two features disclosed in the description, the claims and/or the figures constitute part of the scope of the invention.

In order to avoid repetitions, disclosed features relating to the device are also seen as relating to the method and are thus also claimable therefor. In the same manner, disclosed features relating to the method are also seen as relating to the device and are thus also claimable therefor.

The idea of the invention is to realize frictional forces as low as possible or frictional forces for a very short time period between the annular seal and the lid when the lid is being displaced between its open position and its closed position. According to the invention, a double eccentricity is provided which leads to a significant reduction both of the magnitude of the frictional forces and of the duration of the frictional forces. In fact, the double eccentricity leads to the fact that the lid or its closure section comes into contact with the annular seal for only a very short period of time or for only a very small pivot area of approximately 0° to 10°, in relation to the closed position. The two eccentricities also lead to the fact that the lid is not displaced by an exclusively rotational displacement movement, but the mainly rotational displacement movement comprises a translational part which leads to the fact that the lid exerts a reduced flexing force on the annular seal. Additionally, the double eccentricity leads to the fact that the lid projects from the opening in an uneven manner when the lid is in its open position, for example at an opening angle of 90°. While a large part of the lid projects from one side of the opening, only a small part of the lid can project from the other side of the opening at the same time. Installation space and transport costs can therefore be reduced.

The closure section plane is defined by the closure section when the lid is in the closed position, said closure section plane being at the same height as the contact between the closure section and the annular seal.

In a preferred embodiment of the closure device according to the invention, the lid is mounted so as to be pivotable along the pivot axis at two opposite rotary joints, preferably at at least one shaft section, more preferably at two shaft sections which coincide with the pivot axis. The rotary joints can have slide bearings or rolling bearings.

In another preferred embodiment of the closure device according to the invention, the main body has a flange, the annular seal being disposed at said flange and the flange and/or the annular seal being realized in such a manner that at least one cavity is realized between the flange and the annular seal when the lid is in its open position. The seal can therefore be pushed into the cavity when the lid contacts the seal.

According to another preferred embodiment of the closure device according to the invention, a cavity faces the lid and/or a cavity is disposed in such a manner that it faces a barrier system which can be connected to the closure device. The cavity which faces the lid leads to the fact that a tolerance compensation can take place and resulting frictional forces between the seal and the lid can be further reduced. The cavity which faces the barrier system also leads to the fact that only low forces are required for the connection of the closure device to the barrier system, preferably for screwing said barrier system into the closure device via a bayonet mount.

According to another preferred embodiment of the closure device according to the invention, the annular seal has a largely circular or a C-shaped cross section. The seal which has a circular cross section can be a conventional O-ring, which is cost-efficient. The seal which has a C-shaped cross section offers the possibility of realizing the cavity.

According to another preferred embodiment of the closure device according to the invention, it is conceivable that the annular seal is at least sectionwise designed so as to be conically widening in the direction of the rotary axis. Resulting frictional forces between the seal and the lid can thus be further reduced and a tightly sealed closed position can be ensured.

The filter unit according to the invention offers the possibility of closing the interior on the side of a gap-free housing section of the filter unit opposite to the opening in a reliable manner; said embodiment is preferred in order to reliably avoid an escape of potentially toxic particles through sealed gaps as can be the case in the spindle solution described in the state of the art. A leakage cannot occur because of a flexed-out seal, either.

The invention also comprises a barrier system, in particular an isolator, preferably for pharmaceutical applications, the isolator being preferably realized in the aforementioned manner and thus particularly preferably having decontamination agents for decontaminating the treatment chamber, preferably hydrogen peroxide. The barrier system according to the invention is characterized by a filter unit which is inserted into the return air duct or exhaust air duct in a removable manner and which is realized according to the idea of the invention, or preferably several such filter units.

BRIEF DESCRIPTION OF THE DRAWINGS

Further advantages, features and details of the invention are apparent from the following description of preferred exemplary embodiments and from the base of the drawings.

In the drawings.

DETAILED DESCRIPTION

In the figures, the same elements and elements having the same function are referenced with the same reference signs.

Figure 1:
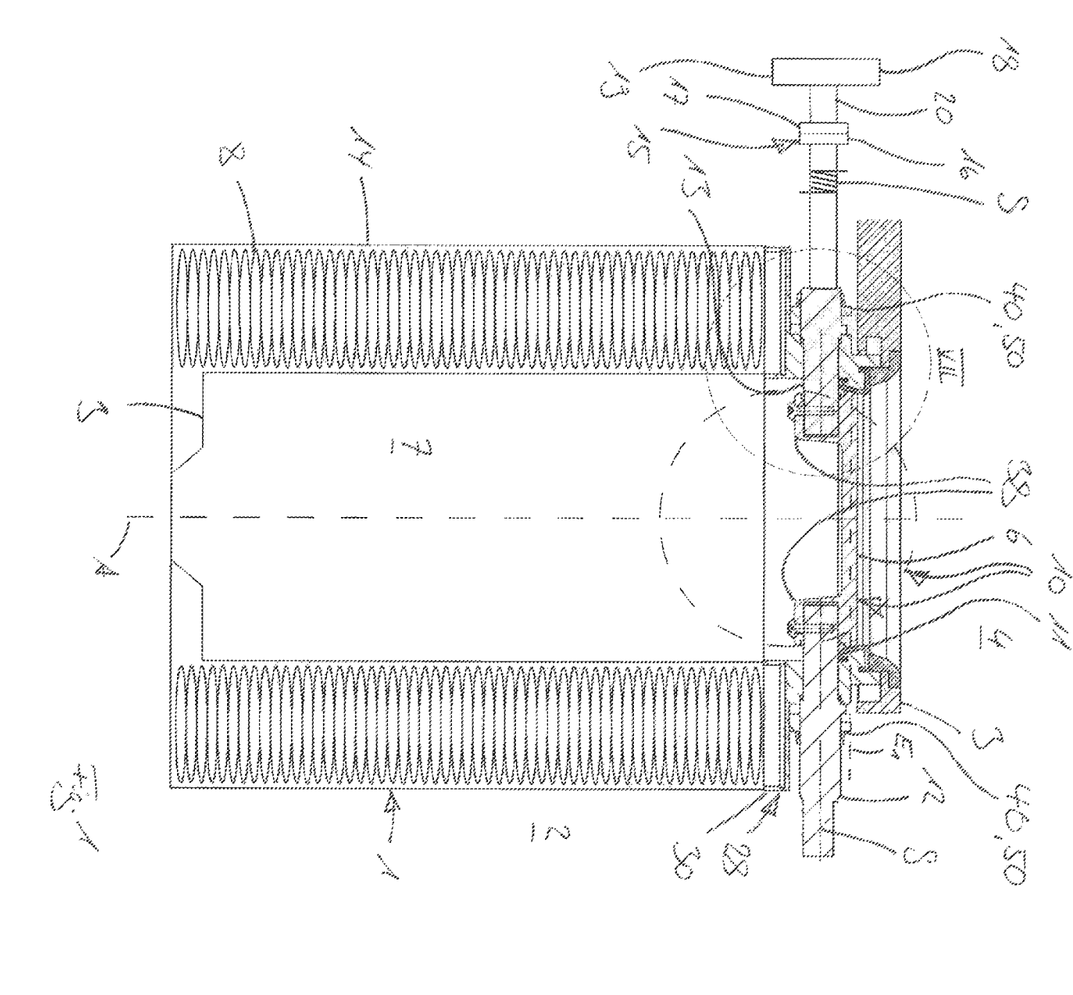
FIG. 1 is an exemplary embodiment of a filter unit realized according to the idea of the invention and fixed to a (partially shown) barrier system for displacing the flap in a sectional view along a line 1-1 according to FIG. 6.
Figure 2:
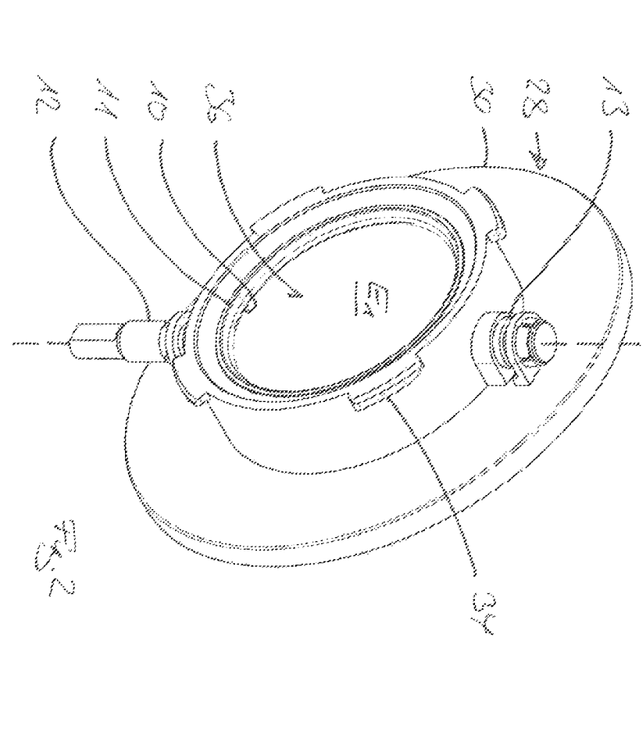
FIG. 2 is a perspective top view of a closure device according to the invention according to FIG. 1 in the closed position.
Figure 3:
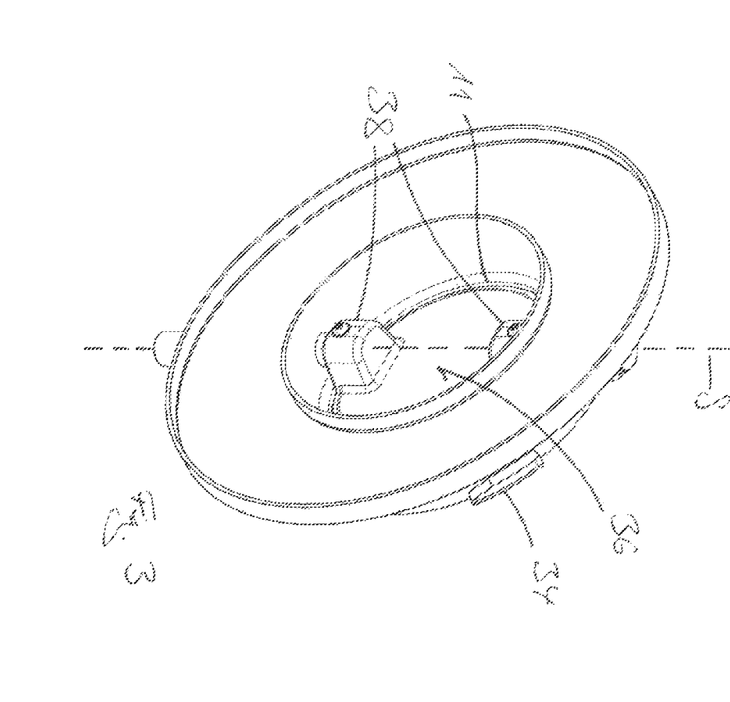
FIG. 3 is a perspective bottom view of a closure device according to the invention according to FIG. 1 in the closed position.

In FIG. 1, a filter unit 1 realized as a filter cartridge is shown in a schematic manner, filter unit 1 being inserted into a return air duct or exhaust air duct 2 of a barrier system 3 preferably realized as a pharmaceutical isolator and comprising a treatment chamber 4. Filter unit 1 has a substantially cylindrical design and is shown in a longitudinal sectional view in FIG. 1. It shows a central longitudinal axis A, in the present case in the form of the longitudinal median axis, which extends along the longitudinal extension of filter unit 1 and which coincides with an insertion direction or axis for inserting the filter unit into the shown position at barrier system 3. Longitudinal axis A passes through a frontal opening 6 of filter unit 1 through which gas, in the present case air, can flow in an axial direction from treatment chamber 4 into an interior 7 of filter unit 1 (when opening 6 is open), from where the gas flows outwards in a radial direction into filter means 8 which have a hollow-cylindrical contour and out of which the (filtered) gas flows outwards in the radial direction into return air duct or exhaust air duct 2. The interior of filter unit 1 is closed without gaps by a housing section 9 on the side opposite to opening 6 in the axial direction.

Opening 6 is realized in a closure device 28 which has a main body 30 and which is disposed at the end of filter unit 1 opposite to housing section 9. At the circumference, opening 6 is limited by an annular seal 11 and annular seal 11 is disposed at a flange 32.

A lid 10 realized and disposed as a flap is provided for opening and closing opening 6 and therefore interior 7, wherein lid 10 can be pivoted between the shown closed position and an open position (indicated by the dashed line) about a pivot axis S which preferably extends perpendicularly to longitudinal axis A.

It can be seen that lid 10 can be pivoted outside the preferably elastomeric annular seal 11 at the opening edge of opening 6, which ensures a sealed closure in the closed position. At the same time, said annular seal 11, or alternatively an additional annular seal, axially contacts barrier system 3 in a sealing manner. A sufficient sealing pressure is ensured by a corresponding axial force application on filter unit 1 along longitudinal axis A towards barrier system 3, wherein said axial force can be applied, for example, by a locking mechanism and/or closure screws and/or a bayonet mount or similar fastening and/or positioning means in a manner known per se.

Opposite shaft sections 12, 13, via which lid 10 is connected to bearings 50 so as to be pivotable in relation to a housing 14 of the filter unit, are assigned to lid 10 along pivot axis S and are permanently connected to lid 10. A releasable coupling 15 for torque transmission, which is shown in a merely schematic manner as a black box, is located at the end of shaft section 13 on the left side in the drawing layer. Coupling 15 is composed of a coupling output section 16 on the side of the shaft section and a coupling drive section 17 connected thereto in a torque-transmitting manner on the side of the barrier system, coupling drive section 17 being part of a drive device 18 fixed to the housing on the side of the barrier system, in the present case an automatic drive device 18 which has an electric motor 19. Coupling drive section 17 is pivoted via a corresponding shaft 20 by rotating electric motor 19, causing coupling output section 16 and thus shaft section 13 comprising lid 10 to be pivoted via the torque-transmitting coupling.

Figure 8:
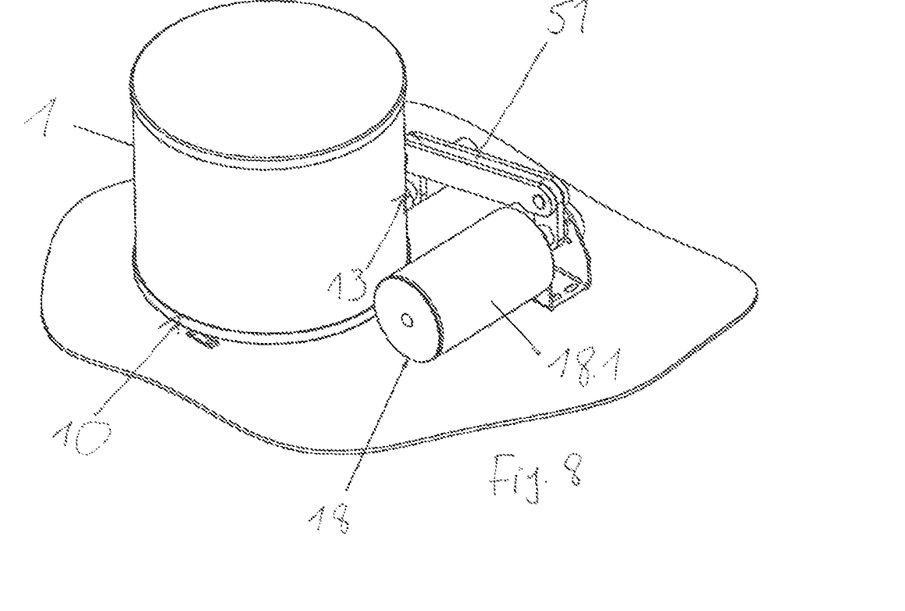
FIGS. 8 and 9 show alternative solutions for transmitting torque between drive devices and shaft section and therefore lid.
Figure 9:
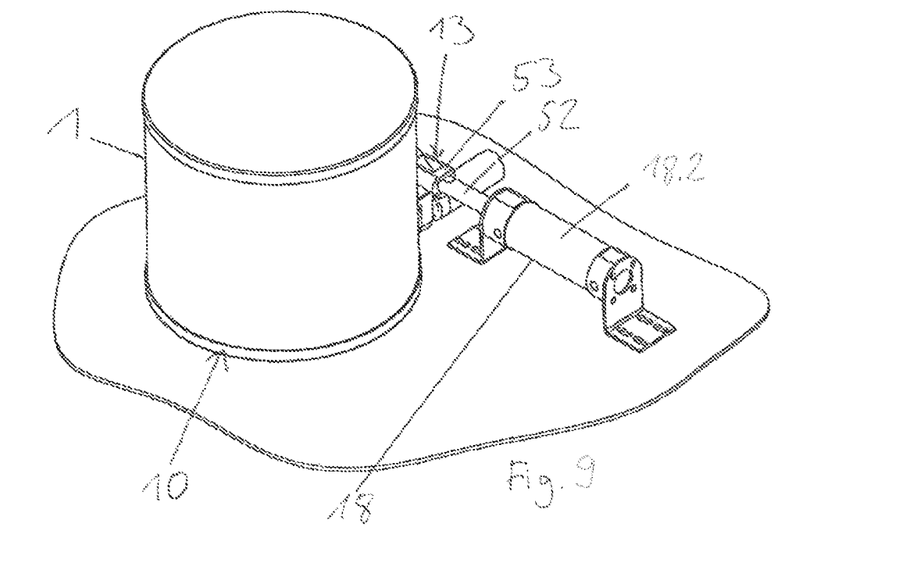

Alternative solutions for transmitting torque between drive devices 18 and shaft section 13 and therefore lid 10 are shown in FIGS. 8 and 9 and are explained in detail in the corresponding description. However, the direct transmission of a torque from a drive device 18 to a drive journal or shaft section 13 can also be provided in an advantageous manner.

In an exemplary manner, a bearing journal which axially protrudes into lid 10 can be provided instead of shaft section 12. In general, it is also possible of course to mount the flap or lid 10 by other means, for example via one or two bearing journals which protrude(s) into the flap along pivot axis S.

Electric motor 19 can preferably be driven in such a manner that lid 10 takes a defined opening pivot angle which can preferably be adjusted. It is conceivable to define said open position via a limit switch which can preferably be fixed in different positions, in particular of the barrier system, for adjusting the desired opening angle.

Closing spring means 5 comprising a torsion spring are referenced with reference sign 5, wherein lid 10 can be pivoted from the closed pivot position into an open pivot position against the spring force of said closing spring means 5.

FIGS. 2 to 5 show closure device 28 in isolation comprising a lid 10 in the closed position (FIGS. 2 and 3) and a lid 10 which is displaced into an open position (FIGS. 4 and 5) by an opening pivot angle of 90° relative thereto. However, the opening position can also have a smaller opening angle, the closed position being realized at an angle of 0°. It can be seen that main body 30 has four closure catches 34 of a bayonet mount which are evenly spaced apart on the end which can face barrier system 3 in order to fix main body 30 to barrier system 3 in a removable manner.

Figure 4:
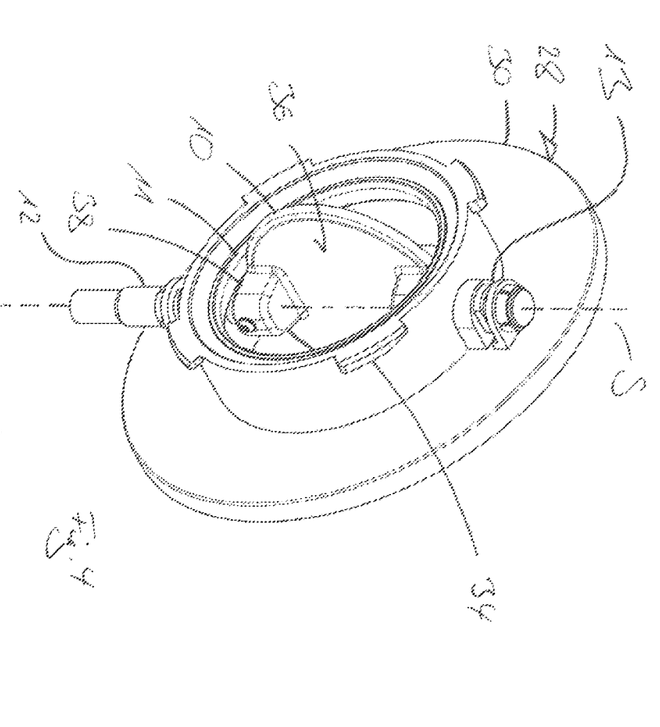
FIG. 4 is a perspective top view of a closure device according to the invention according to FIG. 1 in the open position.
Figure 5:
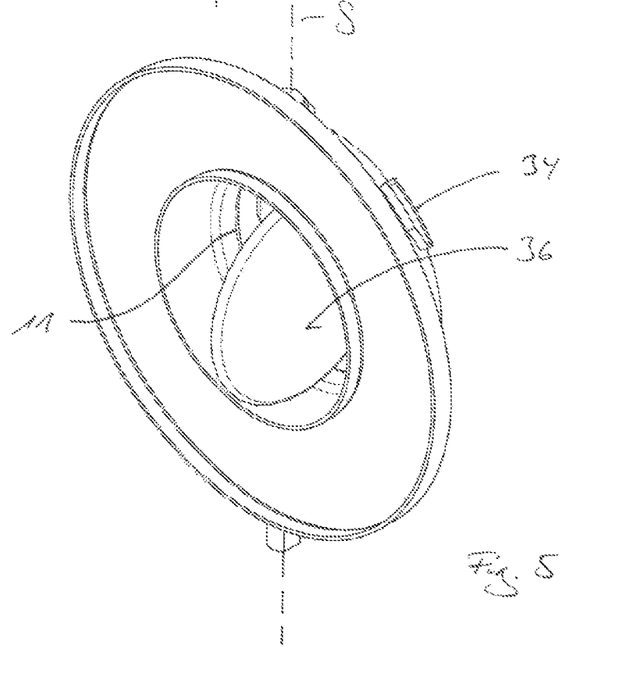
FIG. 5 is a perspective bottom view of a closure device according to the invention according to FIG. 1 in the open position.
Figure 6:
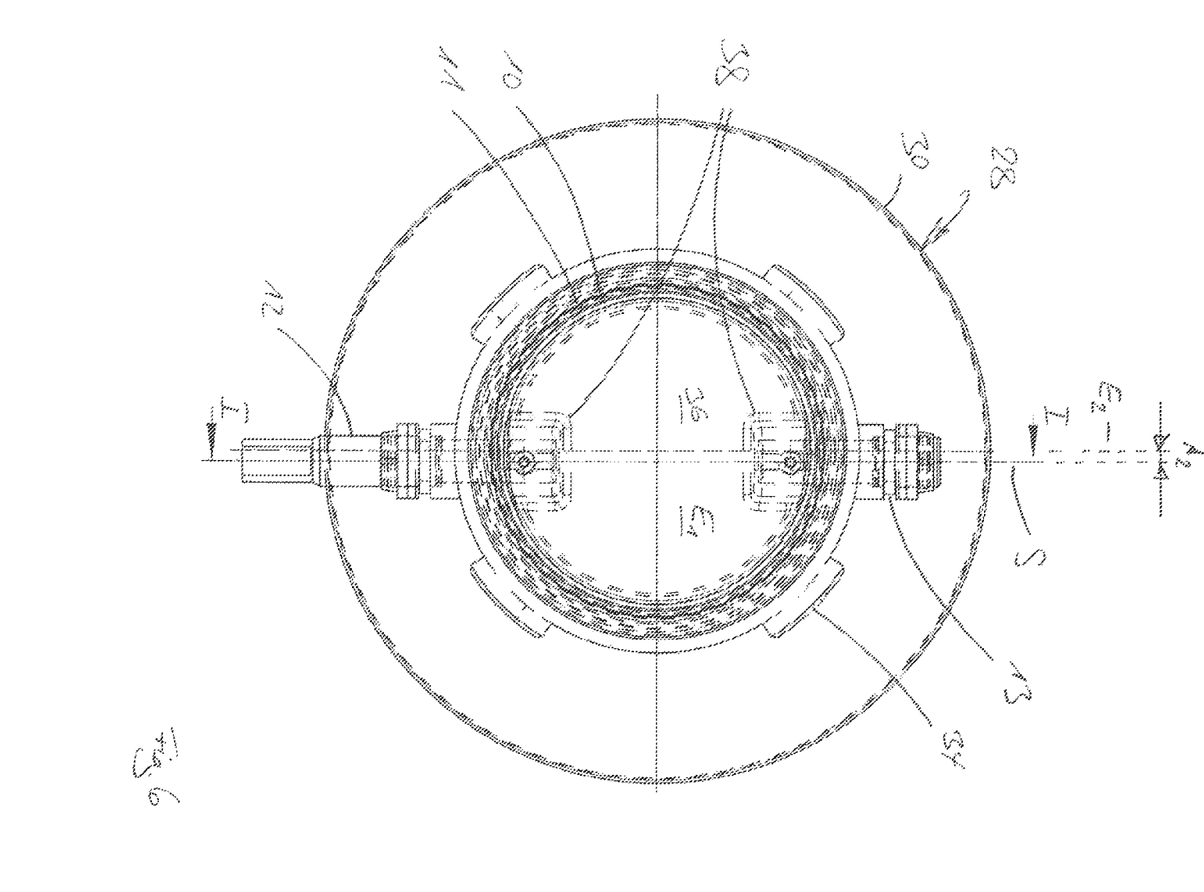
FIG. 6 is a top view of a closure device according to the invention according to FIG. 1 in the closed position.
Figure 7:
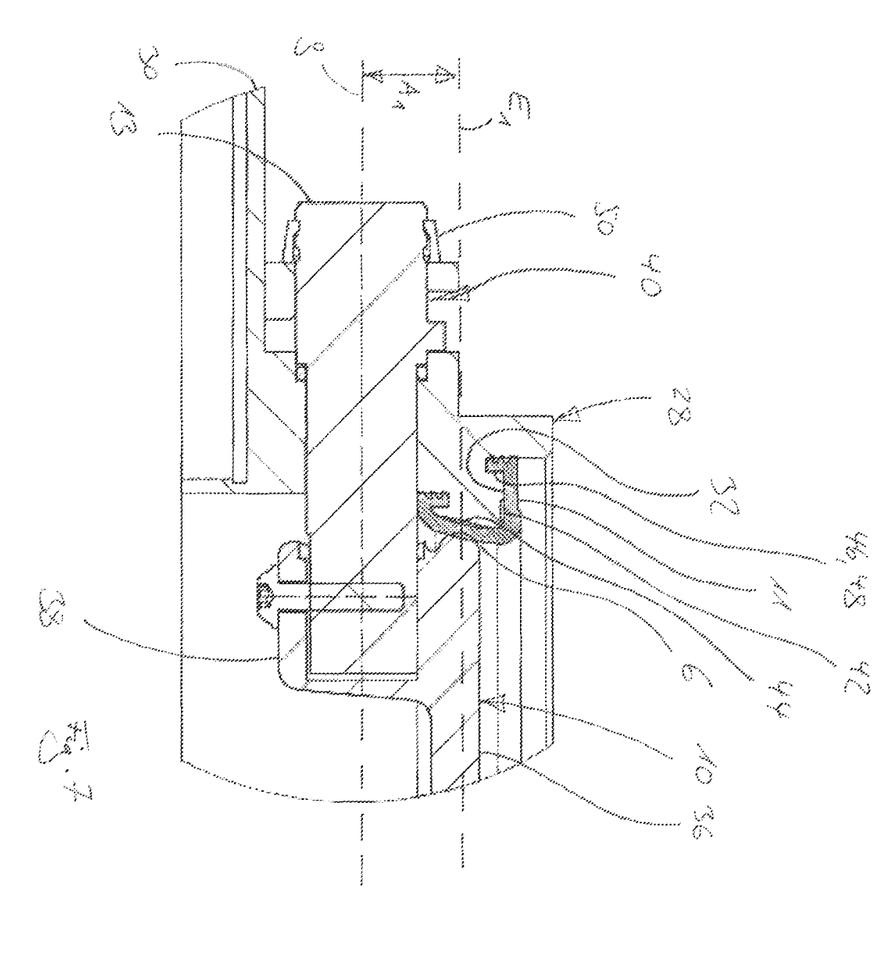
FIG. 7 is a detailed view of section VII according to FIG. 1.

Lid 10 has a preferably circular closure section 36, which is the section which closes opening section 36. In the closed positon, closure section 36 contacts annular seal 11 in a sealing manner. Closure section 36 is supported by two opposite base sections 38 which are connected to closure section 36 in a co-rotating manner. Base sections 38 and shaft sections 12 and 13 together each realize a rotary joint 40 through which pivot axis S passes.

first eccentricity is shown, in particular, in FIGS. 1 and 7, because pivot axis S does not coincide with a closure section plane $E_1$ in which closure section 36 is located. On the contrary, a distance $A_1$ is provided between closure section plane $E_1$ and pivot axis S. Closure section plane $E_1$ and pivot axis S run parallel to one another. A second eccentricity is shown in FIG. 4 in conjunction with FIG. 5 and in FIG. 6. In fact, pivot axis S is disposed at a distance $A_2$ to a vertical longitudinal median plane $E_2$ which passes vertically through the center of the lid (10) in the closed position. Vertical longitudinal median plane $E_2$ and pivot axis S run parallel to one another. As a result, the projection of lid 10 from opening 6 in FIG. 4 is thus significantly shorter than in FIG. 5. If lid 10 is disposed in a housing 14 according to FIG. 1, a large part of lid 10 thus protrudes into interior 7, whereas only a small part of lid 10 projects from opening 6 on the side of the barrier system.

FIGS. 6 and 7 illustrate the double eccentricity according to the invention. Closure section plane $E_1$ is defined by closure section 36 in its closed position. Vertical longitudinal median plane $E_2$ passes vertically through the center of lid 10 in its closed position. As shown in FIG. 7, the first eccentricity results from distance $A_1$ between pivot axis S and closure section plane $E_1$. As shown in FIG. 6, the second eccentricity results from distance $A_2$ between pivot axis S and vertical longitudinal median plane $E_2$.

FIG. 7 shows particularly annular seal 11 which is disposed at flange 32. A first cavity 42 is disposed on the side of flange 32 which faces the barrier system and a second cavity 44 is disposed on the side of flange 32 which faces lid 10. Cavities 42 and 44 are disposed between flange 32 and annular seal 11. Annular seal 11 has an approximately C-shaped cross section and two socket sections 46 of annular seal 11 engage fastening grooves 48 at flange 32.

In particular FIG. 7 shows that annular seal 11 is at least sectionwise designed so as to be conically widening in the direction of pivot axis S. Lid 10 can therefore be easily displaced into the closed position in which it contacts annular seal 11.

A securing element which secures lid 10 in its closed position, preferably in an irreversible manner, is not shown. For example, the securing element can be slid onto at least one of shaft sections 12, 13 and can be locked in this position in order to prevent a rotation of lid 10.

FIG. 8 shows a section of a barrier system according to the invention comprising a filter unit 1 and a drive device 18 for transmitting torques from drive device 18 to lid 10, preferably via a shaft section 13. In the example of FIG. 8, the drive device is realized as an electric or pneumatic rotational drive device 18.1 which creates a rotating movement which is transmitted to shaft section 13 via an articulated joint, for example via a toggle joint. As described in the context of FIG. 1, a releasable coupling between drive device 18.1, in particular articulated joint 51, and shaft section 13 can be provided, filter unit 1 or shaft section 13 of the filter unit thus being removable from drive device 18, 18.1 in order to allow for a removal and/or an exchange of the filter unit.

In an alternative embodiment, the barrier system, in particular filter unit 1, has one or two sensor devices which detect the position of lid 10, in particular the final positions of lid 10 in an entirely open or in an entirely closed position, and which preferably communicate said position to a control unit of the barrier system.

Drive device 18 can be realized in such a manner that a stop is reached when an entirely open position of lid 10 or an open final position of lid 10 is reached, the drive device thus running into a block or stop in order to reach the open or opened final position of lid 10. At least one sensor device can be realized in such a manner that the operating parameters of the drive device, e.g., current, voltage, pneumatic pressure or the like, are detected and are used as indirect measurement parameters for detecting at least one final position of lid 10.

An alternative embodiment of drive device 18 is shown in FIG. 9, in which linear drive device 18.2 is realized as a pneumatic linear drive to which a piston rod 52 is assigned which translates the linear movement of drive device 18.2 in conjunction with an actuation device 53 into a rotational movement or a torque and transmits it to shaft section 13. A mechanical stop can also be realized in said embodiment, the stop limiting the movement of the drive device at the latest when lid 10 reaches the entirely open and/or entirely closed position. A releasable coupling to shaft section 13 can also be provided for actuation device 53.

REFERENCE SIGNS 1 filter unit
2 return air duct or exhaust air duct
3 barrier system
4 treatment chamber
5 closing spring means
6 opening
7 interior
8 filter means
9 housing section
10 lid
11 annular seal
12 shaft section
13 shaft section
14 housing
15 coupling
16 coupling output section
17 coupling drive section
18 drive device
18.1 rotational drive device
18.2 linear drive device
19 electric motor
20 shaft
21 displacement mechanism
22 pivot lever
23 stop
24 telescope section
25 insertion direction
26 angle gear
28 closure device
30 main body
32 flange
34 closure catches
36 closure section
38 base section
40 rotary joint
42 cavity
44 cavity
46 socket section
48 fastening groove
50 bearing
51 articulated joint
52 piston rod
53 actuation device
A longitudinal axis
$A_1$ distance 1
$A_2$ distance 2
$E_1$ closure section plane
$E_2$ vertical longitudinal median plane
S pivot axis

The invention claimed is:

1. A filter cartridge (1) for removable insertion into a return air duct or exhaust air duct (2) of a barrier system (3), the filter cartridge (1) having filter means (8) extending around a longitudinal axis (A) of the filter cartridge (1) for cleaning of gas supplied in an axial direction via an opening (6) from a treatment chamber (4) of the barrier system (3) and for radial discharge into the return air duct or exhaust air duct (2), the filter cartridge (1) having an interior (7) which can be closed by closing the opening (6) by means of a lid (10) and which is surrounded by the filter means (8) on a radial outside, the filter cartridge (1) further comprising a closure device (28) for the filter cartridge (1), the closure device (28) comprising a main body (30), an annular seal (11), the opening (6) in the main body (30) which can be limited at a circumference by the annular seal (11), the lid (10) which can be displaced between an open position, in which the opening (6) is open, and a closed position, in which the lid (10) contacts the annular seal (11) in a sealing manner, in order to selectively open and close the opening (6) and through which the longitudinal axis (A) passes, the lid (10) being connected to the main body (30) in an articulated manner so as to be pivotable by means of at least one rotary joint (40) through which a pivot axis (S) passes, wherein the lid (10) is designed so as to be pivotable at least double-eccentrically, a first eccentricity resulting from a pivot axis (S) being disposed at a distance ($A_1$) from a closure section plane ($E_1$) in which a closure section (36) of the lid (10) is located, and a second eccentricity resulting from the pivot axis (S) being disposed at a distance ($A_2$) from a vertical longitudinal median plane ($E_2$) which passes vertically through a center of the lid (10) when the lid (10) is in its closed position and the main body (30) having four closure catches (34) of a bayonet mount which are equally spaced apart on an end which can face the barrier system (3) for removable fixation to the barrier system (3), and wherein the annular seal (11) has an approximately C-shaped cross section and two socket sections (46), wherein the two socket sections (46) engage fastening grooves (48) at a flange (32) of the closure device (28).

2. The filter cartridge according to claim 1, wherein the lid (10) is mounted so as to be pivotable along the pivot axis (S) at two opposite rotary joints (40).

3. The filter cartridge according to claim 1, wherein the main body (30) has a flange (32), the annular seal (11) being disposed at said flange (32) and the flange (32) and/or the annular seal (11) being realized in such a manner that at least one cavity (42, 44) is realized between the flange (32) and the annular seal (11) when the lid (10) is in its open position.

4. The filter cartridge according to claim 3, wherein a cavity (42, 44) faces the lid (10) and/or the cavity (42, 44) is disposed in such a manner that it faces the barrier system (3) which can be connected to the closure device (28).

5. The filter cartridge according to claim 1, wherein the annular seal (11) has a largely circular or a C-shaped cross section.

6. The filter cartridge according to claim 1, wherein the annular seal (11) is at least sectionwise designed so as to be conically widening in the direction of the rotary axis (S).

7. The filter cartridge according to claim 1, wherein the lid (10) is securable by at least one securing element in its closed position.

8. A barrier system assembly, comprising at least one filter cartridge according to claim 1, a treatment chamber (4) and the return air duct or the exhaust air duct (2), wherein the at least one filter cartridge is inserted in a removable manner into the return air duct or the exhaust air duct (2).

9. The filter cartridge according to claim 1, wherein the barrier system is an isolator.

10. The filter cartridge according to claim 2, wherein at least one shaft section coincides with the pivot axis (S).

11. The filter cartridge according to claim 10, wherein at least two shaft sections (12, 13) coincide with the pivot axis (S).

12. The filter cartridge according to claim 7, wherein the lid (10) is securable by the at least one securing element, in an irreversible manner, in the closed position.

13. The system of claim 8, wherein the barrier system is an isolator.

14. The system of claim 8, wherein the isolator is an isolator for pharmaceutical applications.

* * * * *